United States Patent [19]
Almogaibil

[11] Patent Number: 5,608,193
[45] Date of Patent: Mar. 4, 1997

[54] TOOL INVENTORY CONTROL SYSTEM AND METHOD

[76] Inventor: Ali H. Almogaibil, 3259 Branard St. Apt. 7, Houston, Tex. 77098

[21] Appl. No.: 402,644

[22] Filed: May 30, 1995

[51] Int. Cl.$^6$ .................................................. G01G 19/22
[52] U.S. Cl. .................... 177/25.13; 364/567; 235/385; 177/50; 177/25.19; 177/25.17
[58] Field of Search ............................ 177/25.17, 25.19, 177/25.13, 25.14, 1, 50; 364/403, 567, 568; 235/385

[56] References Cited

U.S. PATENT DOCUMENTS

| | | | |
|---|---|---|---|
| 3,836,755 | 9/1974 | Ehrat | 235/385 |
| 4,591,705 | 5/1986 | Toudon | 235/385 X |
| 4,676,343 | 6/1987 | Humble et al. | 177/50 X |
| 4,724,306 | 2/1988 | Kitaoka et al. | 235/385 |
| 4,779,706 | 10/1988 | Mergenthaler | 235/385 X |
| 4,792,018 | 12/1988 | Humble et al. | 177/50 X |
| 4,917,198 | 4/1990 | Sing | 177/25.14 |
| 5,009,275 | 4/1991 | Sheehan | 177/25.13 |
| 5,025,140 | 6/1991 | Varley | 235/385 |
| 5,088,586 | 2/1992 | Isobe et al. | 364/403 X |
| 5,260,690 | 11/1993 | Mann et al. | 364/403 X |
| 5,313,393 | 5/1994 | Varley et al. | 364/403 |
| 5,378,860 | 1/1995 | Dingfelder et al. | 177/25.19 |
| 5,449,864 | 9/1995 | Beatty et al. | 177/25.14 |

*Primary Examiner*—Peter S. Wong
*Assistant Examiner*—Randy W. Gibson

[57] ABSTRACT

The invention uses the electronic scale and the computer to track tool inventories. Users weigh tools (including the tool box) before and after performing mechanical or other critical work. Discrepancies between the two weights are noted by a supervisor or optional computer software. To aid in the resolution of weight discrepancies, software can be used to search a database and suggest which tool may have been left behind. Any tool weight discrepancies, which could be a decrease or increase in weight for the second weighing, must be addressed and resolved before the maintenance work is safely completed. The invention has applications in areas where strict inventory of tools and equipment must be maintained such as the medical and dental fields, other safety-related mechanical work, and tracking of tools going into and out of penal institutions. Leaving tools behind or removing parts during maintenance work can result in unsafe operating conditions and/or operating failure.

7 Claims, 1 Drawing Sheet

TOOL INVENTORY CONTROL SYSTEM AND METHOD

TECHNICAL FIELD

The Tool Inventory Control System and Method is a weighing inventory system. The primary function of the Tool Inventory Control System and Method is inventorying and tracking aircraft mechanics' tools to prevent the accidental abandonment of tools within the aircraft and the accidental removal of airplane parts. The invention has applications in other areas where strict inventory of tools and equipment must be maintained such as the medical and dental fields, other safety-related mechanical work, and tracking of tools going into and out of penal institutions. Leaving tools behind or removing parts during maintenance work can result in unsafe operating conditions and/or operating failure.

DESCRIPTION OF THE PRIOR ART

U.S. Pat. No. 4,917,198 ('198) is a weighing inventory system for weighing several identical objects at the same time. The system taught in the '198 patent uses a series of weighing platforms where each platform is supported on a piston which operates in a fluid pressure cylinder. The computer can determine the weight from the pressure value, store the data, and print out an accurate count of the objects on each platform.

Kitaoka et al show a computerized inventory control system with a visual display and a printer for outputting information and a card reader for identifying individual users (Col 1, In 35 to col 2, In 68).

Sheehan discloses a computerized system where the number of items used is monitored by measuring the total weight (Col. 1, Ins 6–37). The references to Sing, Varley, Isobe et al. Mann et al, and Varley et al were disclosed by the applicant.

Dingfelder et al disclose a computerized system where a person is weighed upon entering and leaving an area and an alarm is signaled if the two weight readings do not match (Col 3, In 40 to col. 4, In 36).

Toudou discloses a computerized inventory control system that identifies a user by a card reader and verifies that materials are being transported into, or out of, a controlled area by measuring the total weight of a container (Col. 3, In 53 to col 5, In 31).

Ehrat discloses a computerized inventory control system that signals an alarm if the combined calculated total weight of articles scanned by a machine code reader does not match the measured total weight (Col. 4, Ins 4–62).

Mergenthaler discloses a computerized inventory control system that signals an alarm if the combined calculated total weight of articles scanned by a machine code reader in each individual container (bag) does not match the measured total weight of each individual container (Col. 1, In 51 to col 2, In 14).

Humble et al ('018) show a computerized inventory control system that signals an alarm if the calculated weight of articles scanned by a machine code reader does not match the measured weight of articles on a scale which is protected from tampering by a light curtain; they also disclose a visual display and a printer for outputting information (Col. 2, In 58 to col. 3, In 68).

Humble et al ('343) show a computerized inventory control system that signals an alarm if the calculated weight of articles scanned by a machine code reader does not match the measured weight of articles on a scale which is protected from tampering by a light curtain; they also disclose a visual display and a printer for outputting information (Col. 4, In 53 to col 6, In 45).

SUMMARY OF THE INVENTION

The object of the invention is to utilize an electronic scale for tracking an inventory of tools before and after maintenance work to assure that 1) no tools were left behind after the work was completed and 2) no parts were accidentally removed from the work site and kept with the tools. A computer which is connected to the scale can be used to print out and store tool box weights before and after maintenance work. The computer software suggests what tools were left behind by searching a tool weight database for a match corresponding to the difference between the before and after maintenance operation weights.

Figure 1:
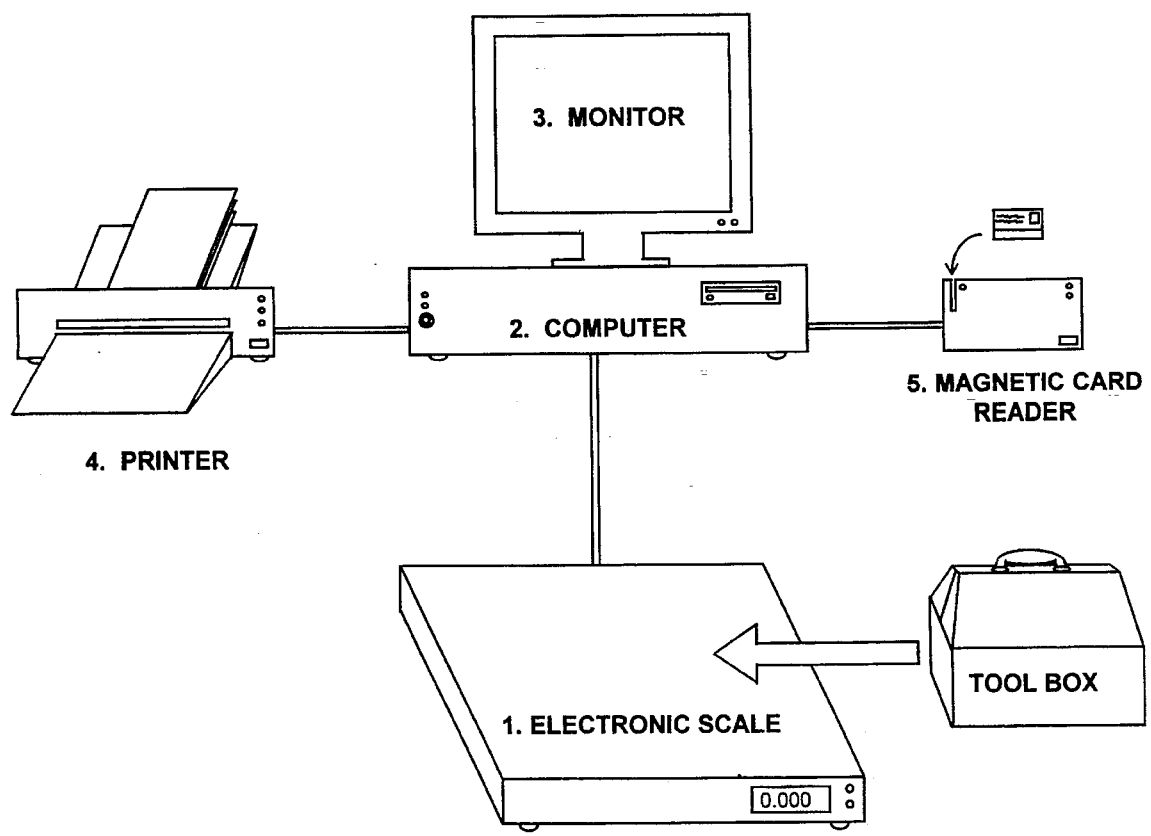
FIG. 1 shows the equipment which is involved in this utility invention. The electronic scale, computer, monitor, magnetic card reader, and printer are all depicted with the required connections.

The utility invention apparatus (see FIG. 1) includes an electronic scale 1 for weighing the total amount of tools brought into and out of the aircraft, a computer 2 for registering, displaying (monitor 3), and printing (printer 4) the beginning and ending weight of the tools, an optional software package that includes a standard weight list for all the tools which are being used for the maintenance procedures, an optional magnetic card reader 5 for access to the system, and an optional anti-tamper device (not depicted in the figure).

DETAILED DESCRIPTION OF INVENTION

1. Prior to approaching the aircraft for maintenance work, the mechanic weighs his complete assembly of tools to be taken into the aircraft, including the tool box if present, on the electronic scale. The initial weight is recorded by the mechanic's supervisor or is stored in a computer database using an optional software package (software is stored on the hard drive inside the computer).

2. After the maintenance procedure is completed, the final weight of the tools is obtained on the electronic scale and stored in the computer. This weight is then compared to the original weight to see if there are any changes. The scale is of sufficient sensitivity to detect the smallest weight discrepancy that could occur through the inadvertent leaving of tools behind in the aircraft or the removal of any airplane parts.

3. If the final weight has changed from the initial weight, the discrepancy must be addressed. Either a tool was left behind in the aircraft or a part was taken by mistake and placed in the tool box. The mechanic's supervisor would need to make sure that the discrepancy is resolved before the repair job is approved and the mechanic is allowed to leave the area.

4. An optional software program is used to search a tool weight database and suggest which tool or tools may have been left behind in the aircraft.

5. The invention also includes an optional magnetic card reader which would allow the aircraft mechanic to access the computer with his unique mechanic's identity card. The magnetic reader would serve to limit the authorized use of the machine and would identify the user for tracking and registering his weighing activity in a computer data base. Daily reports of individual mechanic weighing activity can be produced using optional software.

6. Another option for the invention is an anti-tamper device to prevent manual override of the system. This anti-tamper device includes, for example a light or laser beam positioned between the mechanic and the scale, which must not be disturbed during the weighing process, to provide accurate weightings and eliminate any tampering or interference by the mechanic. The anti-tamper device would facilitate automated use of the weighing machine without the presence of a supervisor to assure that the weighing is done correctly.

I claim:

1. A system for inventory control comprising:

a computing means for analyzing and storing data;

an electronic weighing scale which supplies weight data to said computing means;

an identification reading means for reading a user identification to obtain user data on a current user of said system and which supplies said user data to the computing means;

said computing means further comprising:

a software package which stores in the computing means previous weight data entered into said computing means by a user by placing a container on said scale and placing an identification into said reading means, and compares said previous weight data with current weight data entered by, and which determines which items are unaccounted for in the container by comparing any weight discrepancy between said previous weight data and said current weight data with a standard weight list of known items stored in the computing means.

2. A system according to claim 1, wherein a printer is connected to the computing means for printing out weight data.

3. A system according to claim 1, including a display means coupled to the computing means for displaying weight data.

4. A system according to claim 1, including an anti-tampering device.

5. A system according to claim 4, wherein the anti-tampering device is a light beam positioned between the user and the scale.

6. A system according to claim 1, wherein the identification reading means is a magnetic card reader.

7. A method for inventory control comprising the steps of:

(a) placing a container on a weighing scale;

(b) placing a user identification into a machine reader;

(c) storing weight data from said weighing scale and user data from said machine reader as previous data in a computer connected to the scale and the machine reader;

(d) obtaining current data by placing the container on the weighing scale and placing said user identification on the weighing scale a second time;

(e) comparing said previous data with current data to determine any discrepancy between said weight data of said previous data and said weight data of said current data;

(f) determining which items are unaccounted for in the container by the computer comparing said weight discrepancy with a standard weight list of known items stored in the computer.

* * * * *